Sept. 30, 1958
A. G. HERRMANN
2,853,839
WRAPPER-APPLYING APPARATUS
Filed Sept. 24, 1954
8 Sheets-Sheet 6
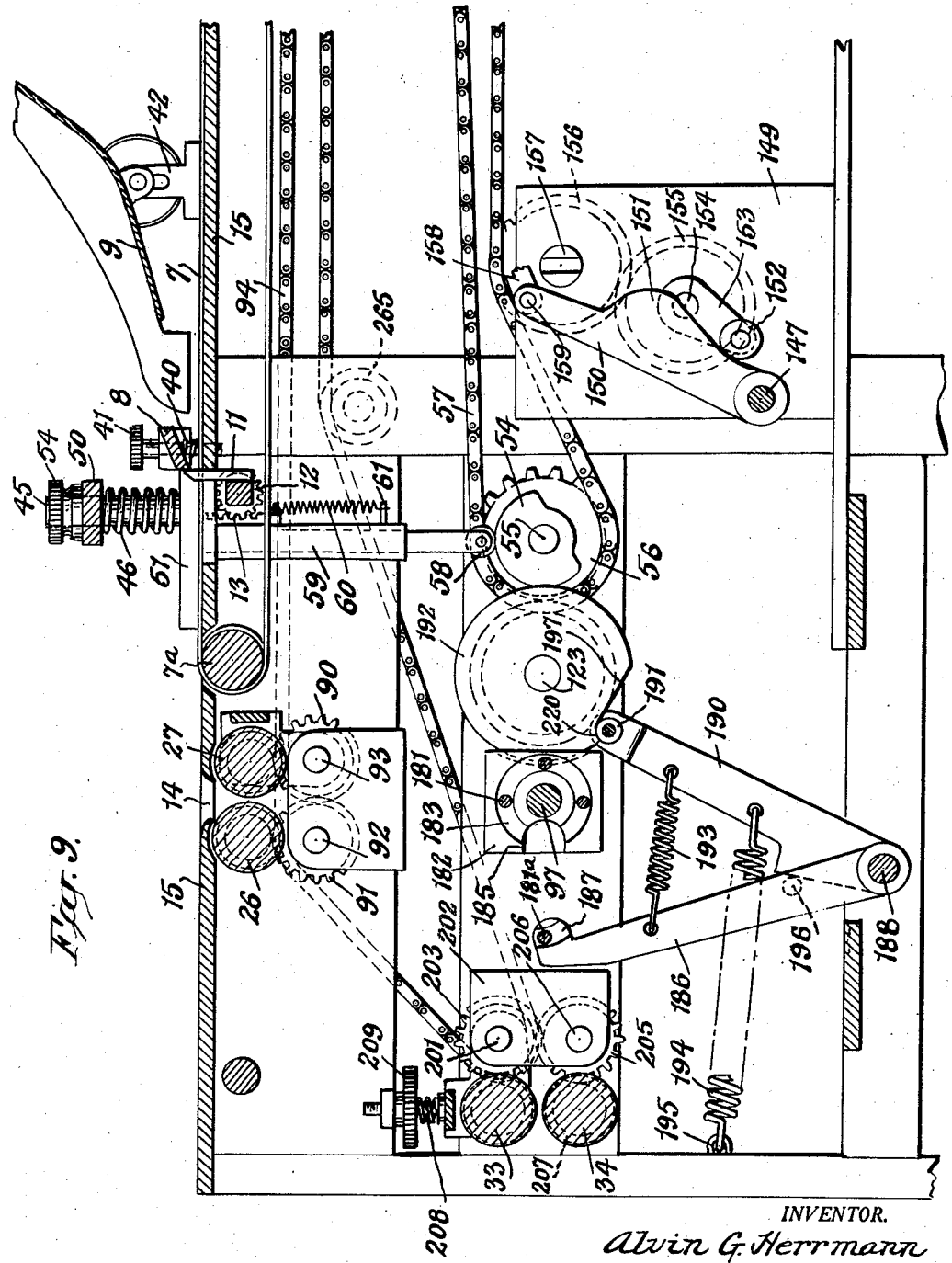
INVENTOR.
Alvin G. Herrmann
BY
Harry Radzinsky
ATTORNEY

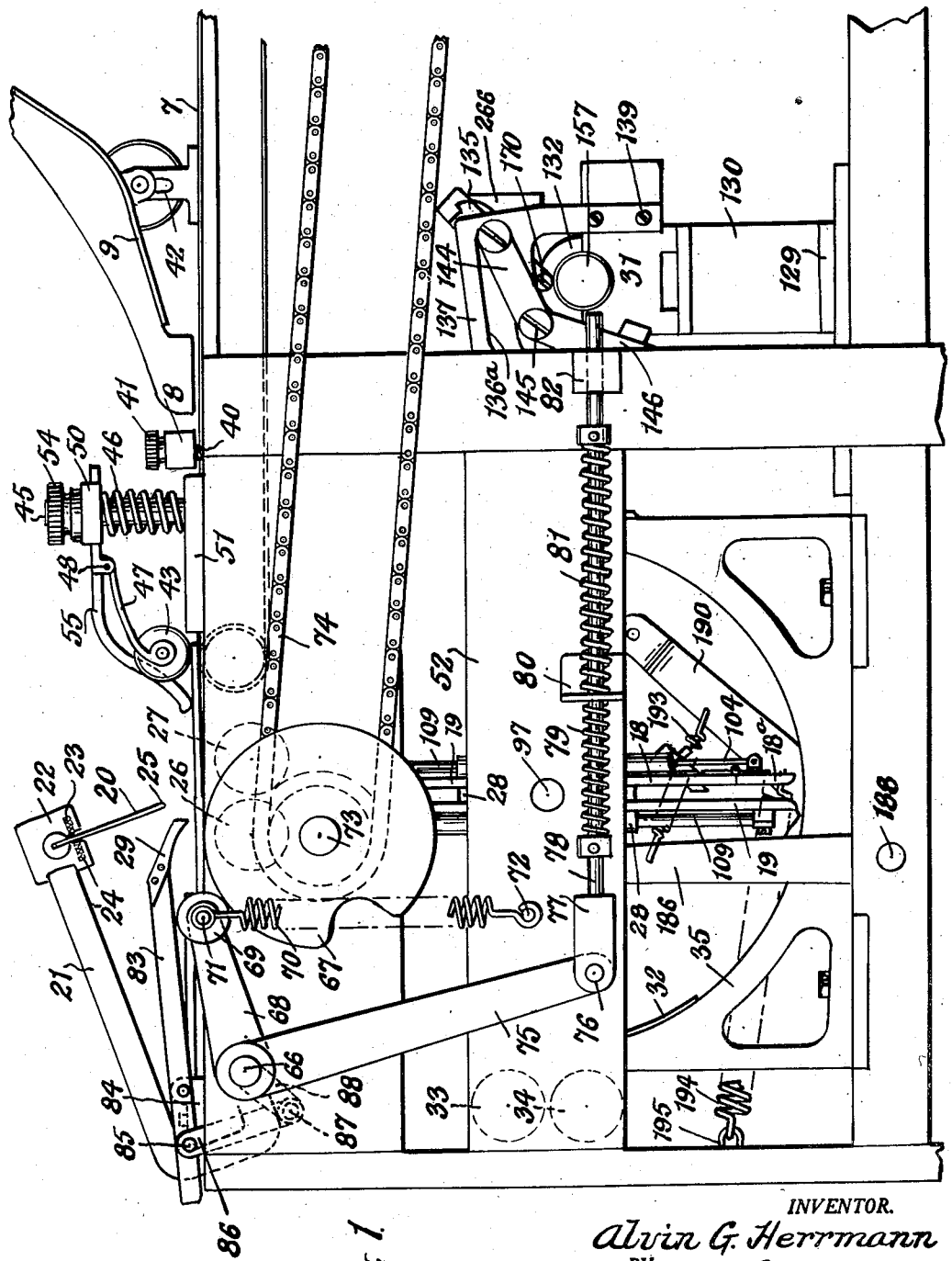

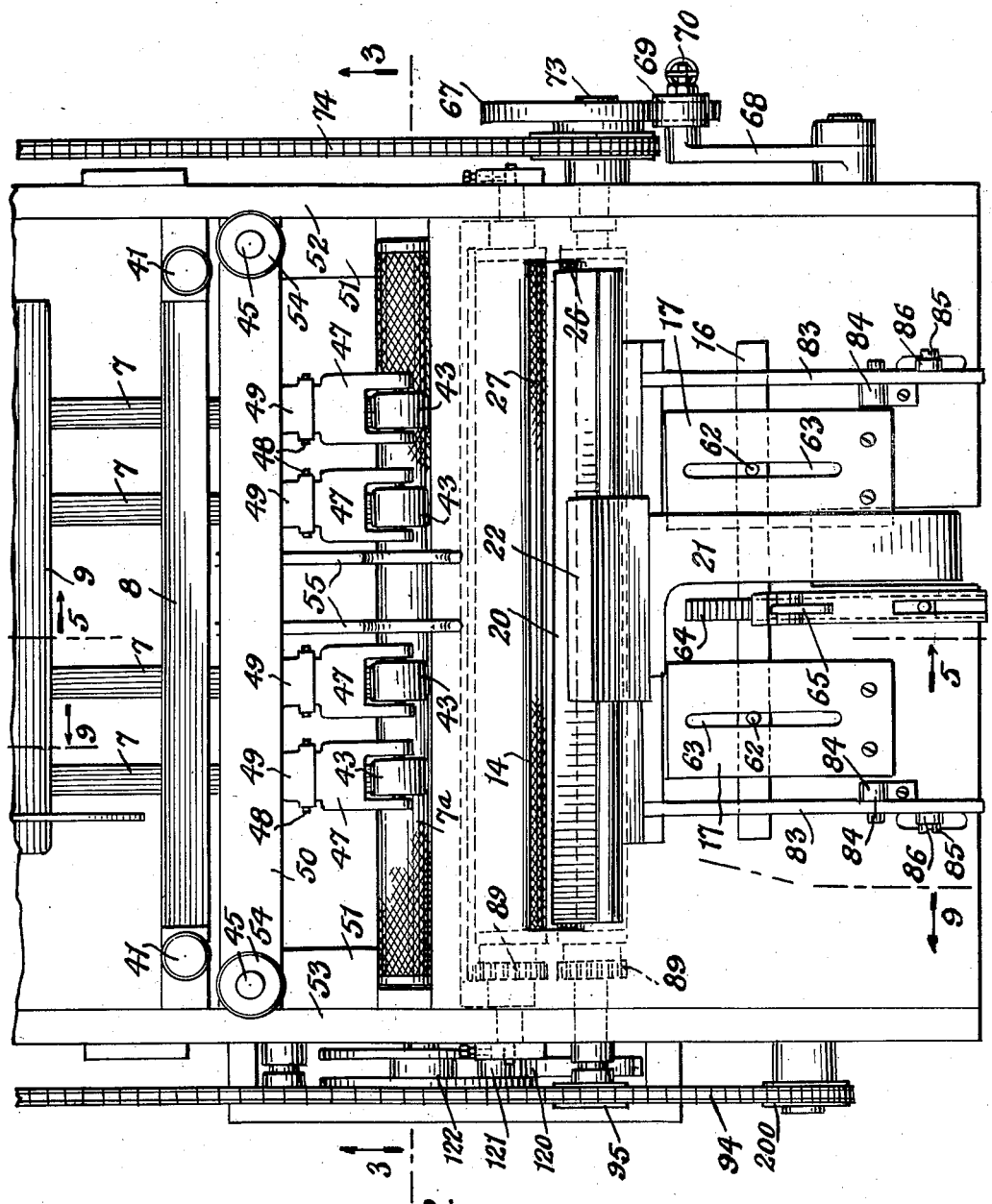

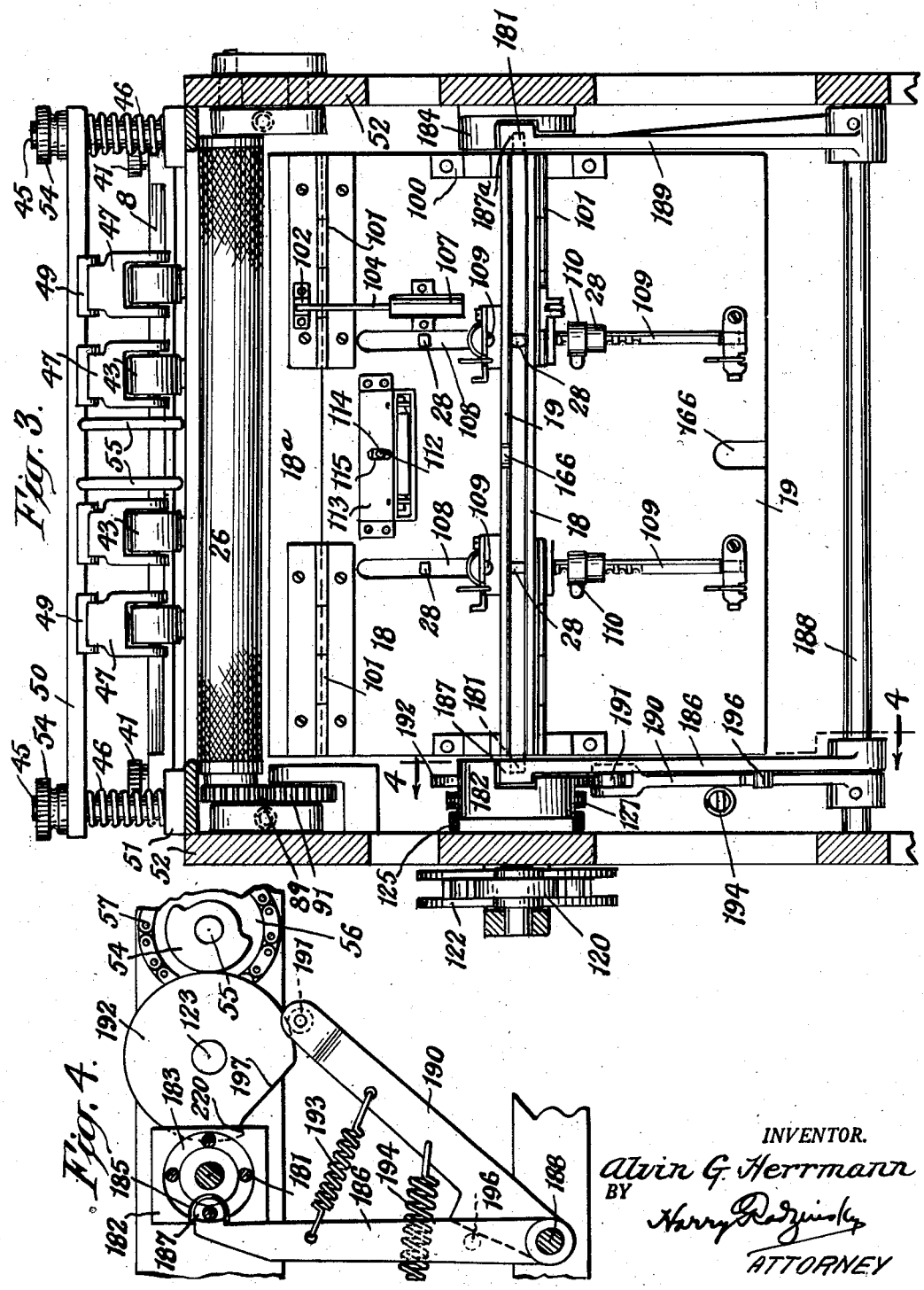

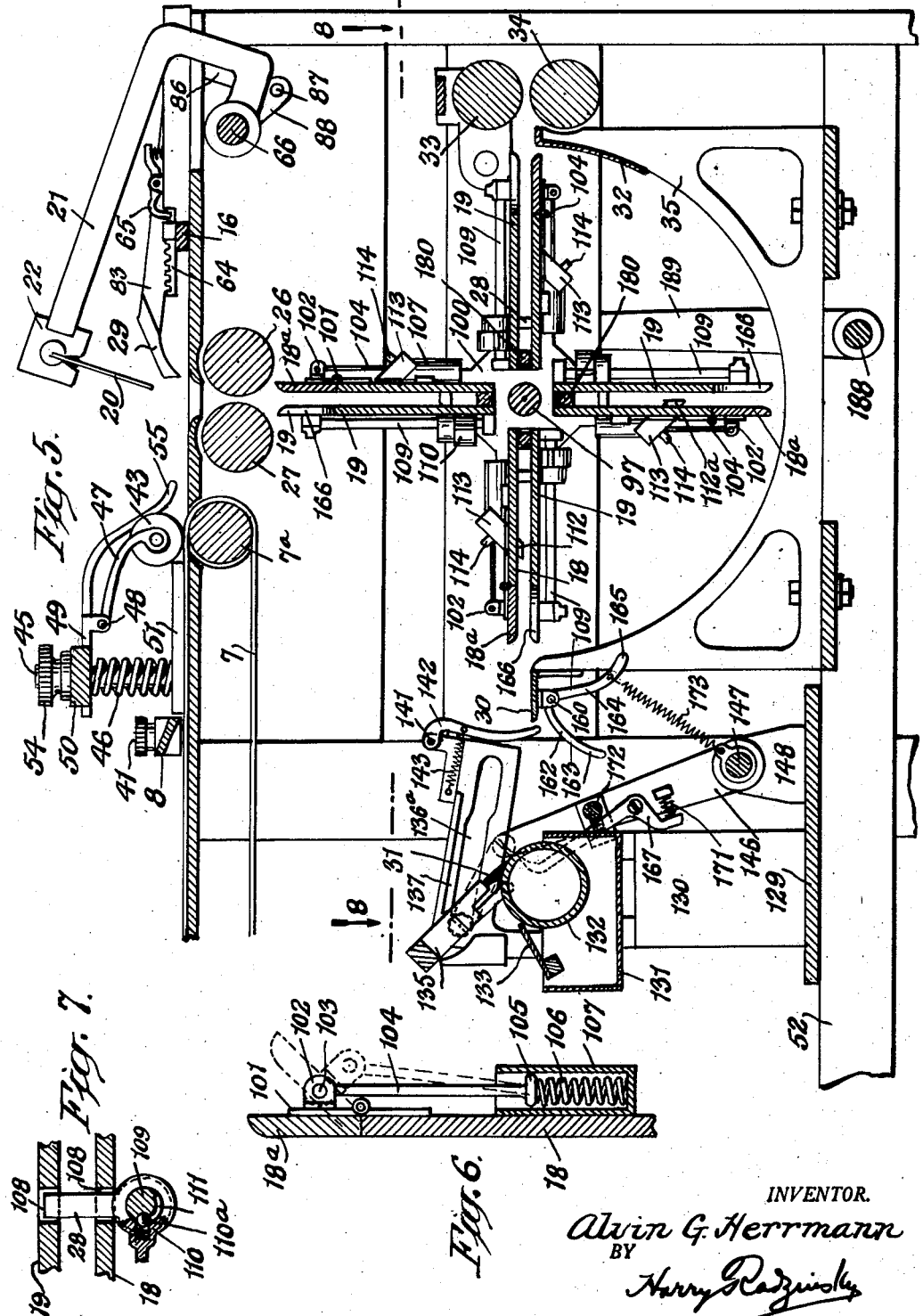

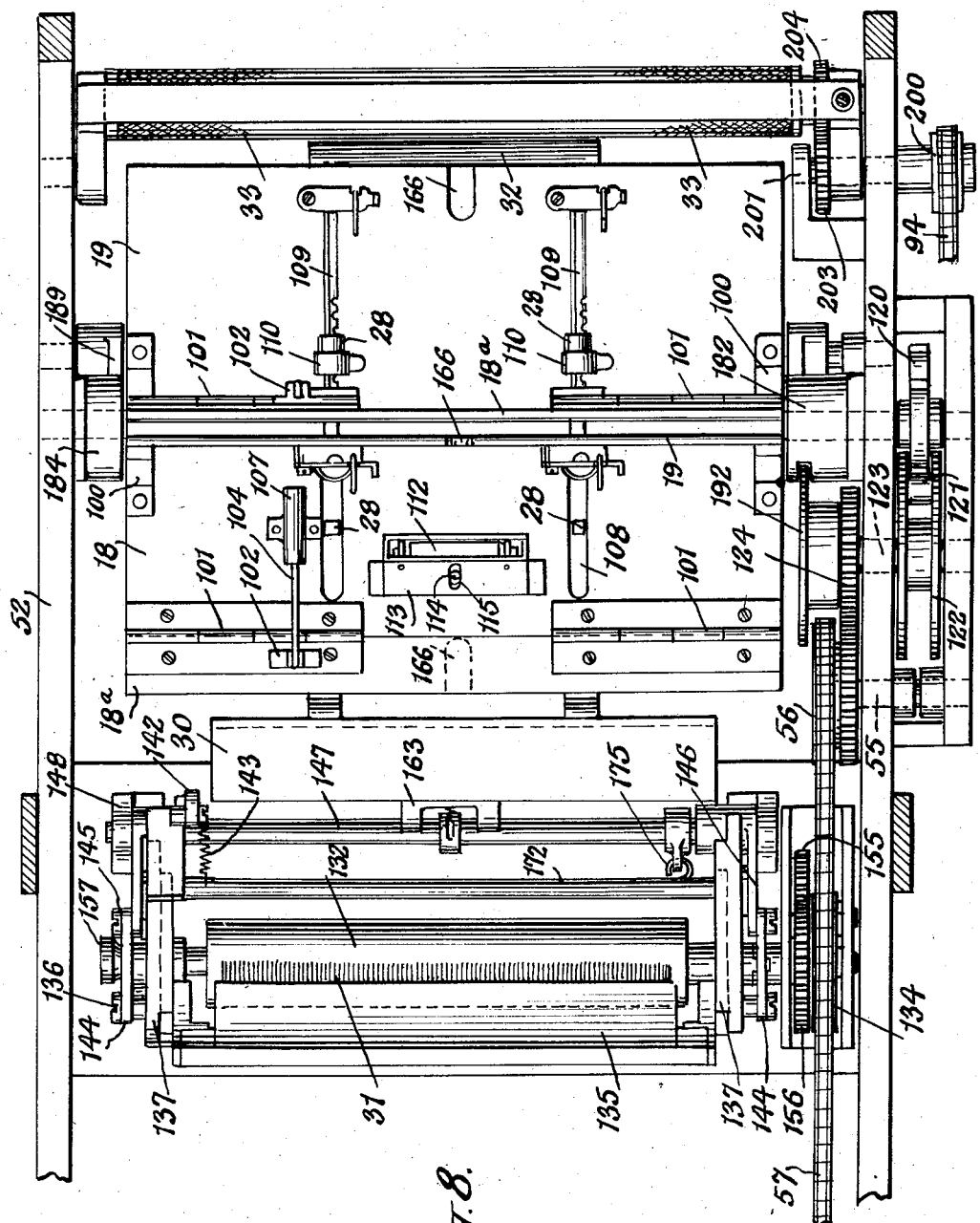

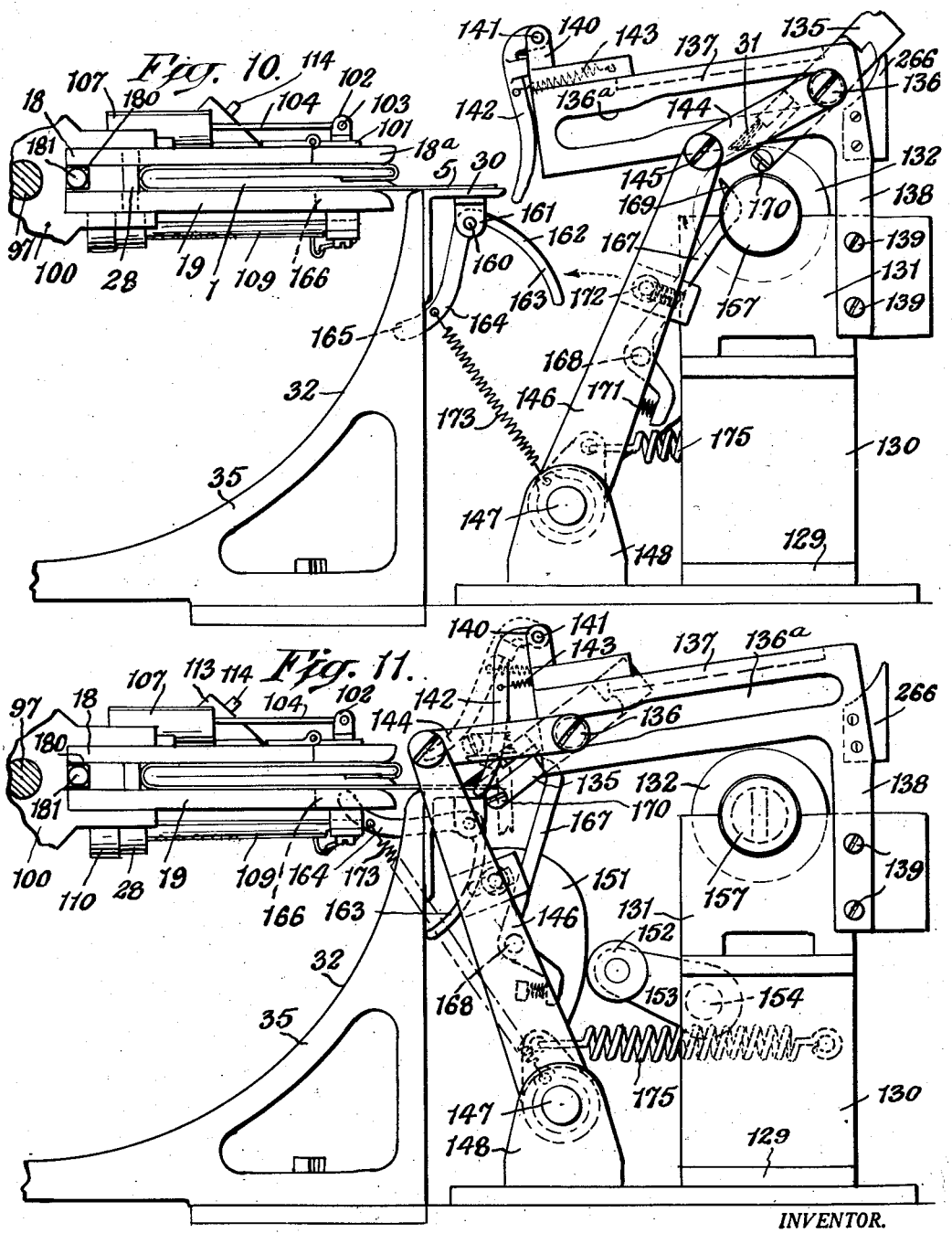

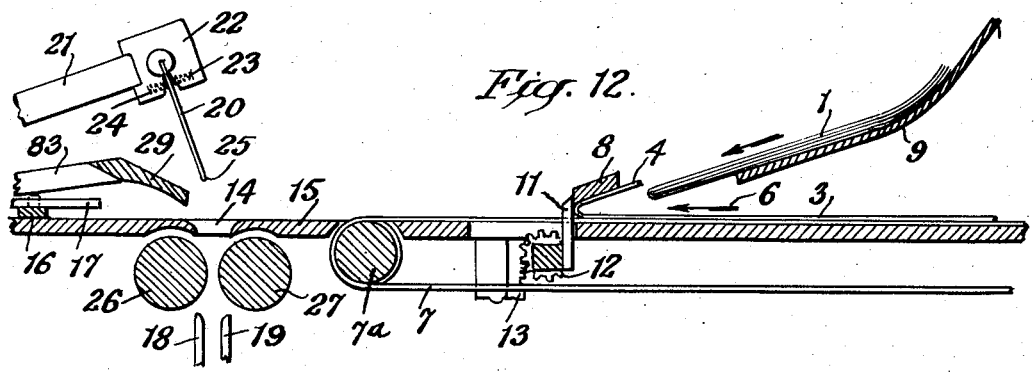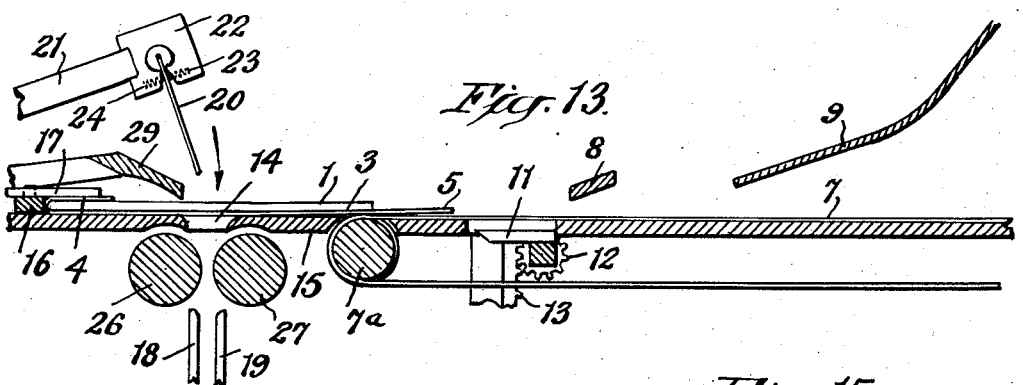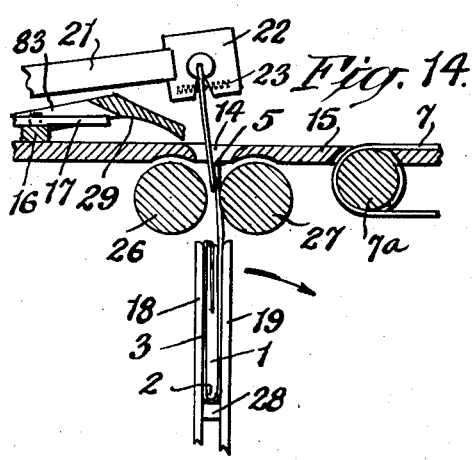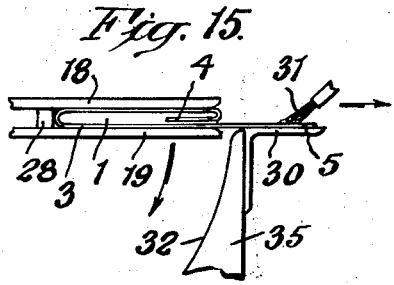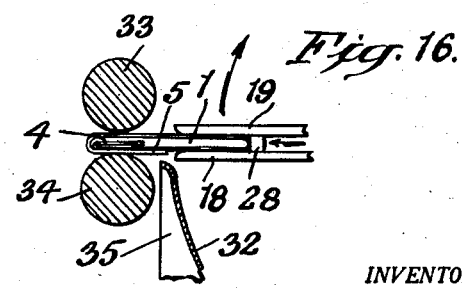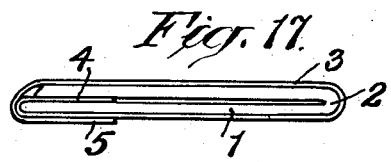

2,853,839
WRAPPER-APPLYING APPARATUS

Alvin G. Herrmann, Freeport, N. Y.; Anna A. Herrmann, administratrix of said Alvin G. Herrmann, deceased, assignor to Contemporary Machine Designers, Inc., New York, N. Y., a corporation of New York Application September 24, 1954, Serial No. 458,124

14 Claims. (Cl. 53—32)

This invention relates to a machine or apparatus for applying wrappers or paper sleeves around such articles as magazines, newspapers, booklets, pamphlets or similar articles preparatory to the mailing of such articles.

It is an object of the invention to provide an apparatus for the purpose described, which will neatly, accurately and speedily apply wrappers to magazines, pamphlets or similar articles of various sizes; which will apply the wrappers at a speed greatly in excess of that of hand work; which will apply the wrappers smoothly and snugly around the articles and have numerous other advantages clearly apparent to those skilled in this art.

It is another object of the invention to provide an automatic wrapping machine of this character which shall be of relatively simple construction; which shall be easy to operate and maintain, and shall be readily applicable to the wrapping of magazines or periodicals of various thicknesses and sizes.

More particularly, the invention contemplates the provision of an apparatus in which a wrapper is infolded at one end and a magazine or pamphlet brought to rest upon the wrapper with an edge of the pamphlet inserted under the infold; the pamphlet and underlying wrapper then being thrust through a slot and between feed rollers and therefrom delivered into the receptive jaws of a rotary carrier positioned below the slot, the carrier then carrying the magazine to a gluing station and pausing thereat to enable a projecting flap of the wrapper to receive a charge of glue, whereupon the carrier brings the magazine and wrapper to an ejection station where the same are ejected from the jaws of the carrier to pass between rollers acting to press the glue-bearing flap of the wrapper against the body of the wrapper so that when the magazine and wrapper emerge from between the rollers, the magazine shall be wrapped or enclosed in a snugly-applied wrapper.

With these and other objects to be hereinafter disclosed in view, I have devised the arrangement of parts to be described and more particularly pointed out in the claims appended hereto.

In the accompanying drawings, wherein an illustrative embodiment of the invention is disclosed, Fig. 1 is a side elevational view of the improved wrapping mechanism;

Fig. 2 is a top plan view of the same;

Fig. 3 is a sectional view, taken substantially on the line 3—3 of Fig. 2, looking in the direction of the arrows;

Fig. 4 is a sectional view, taken substantially on the line 4—4 of Fig. 3, looking in the direction of the arrows;

Fig. 5 is a sectional view, taken substantially on the line 5—5 of Fig. 2, looking in the direction of the arrows;

Fig. 6 is a sectional view through a portion of one of the pamphlet-holding jaws, showing the pivoted or movable portion thereof and the means which resiliently retains it in operative position;

Fig. 7 shows the means for adjusting the position of the stops for limiting the extent of insertion of the pamphlets and wrappers between the jaws of the carrier;

Fig. 8 is a sectional view, taken substantially on the line 8—8 of Fig. 5, looking in the direction of the arrows;

Fig. 9 is a sectional view, taken substantially on the line 9—9 of Fig. 2, looking in the direction of the arrows;

Figs. 10 and 11 are side elevational views, showing the operation of the glue-applying apparatus;

Fig. 12 is a sectional view, diagrammatically showing how the pamphlet is initially received by the wrapper and having one of its edges inserted under the inturned flap thereof;

Fig. 13 is a similar view, showing the pamphlet and wrapper positioned over the slot and above the jaws of the carrier and in readiness to be forced down through the slot and between feed rollers and into position between the jaws of the carrier;

Fig. 14 is a sectional view showing the pamphlet and wrapper held between the jaws of the carrier and ready to be transported to the gluing apparatus;

Fig. 15 shows the projecting portion or flap of the wrapper receiving an application of glue while the pamphlet and wrapper are held between the jaws of the carrier;

Fig. 16 shows the pamphlet and wrapper beginning to emerge from between the jaws of the carrier and entering between the pressing rolls, and Fig. 17 is an end view of the wrapped pamphlet.

The improved wrapping apparatus and its operation will be more easily comprehended, if reference is first made to Figs. 12 to 17 wherein the several steps performed by the apparatus, as well as the completely-wrapped pamphlet are disclosed. The improved apparatus is primarily intended for the wrapping of magazines, newspapers, periodicals and similar articles which are herein, for convenience, referred to as "pamphlets." In most instances, the pamphlet, indicated in the drawings at 1, in its wrapped condition, is doubled or folded upon itself as indicated at 2, and the wrapper, generally indicated at 3, has an infolded edge-flap 4 inserted between the folds or doubled-over parts of the pamphlet. The second edge portion of the wrapper, constituting the glue-bearing flap 5, is disposed on the outside of the wrapper and is adhesively attached to the face of the same. The wrapper as thus applied around the pamphlet, is in the form of a sleeve enclosing the pamphlet and having one end tucked between the folds of the pamphlet, as clearly shown in Fig. 17.

In applying the wrapper, the first step is shown in Fig. 12, wherein it will be seen that the wrapper 3 is carried along, in the direction of the arrow 6, on the conveyor belts 7, which extend around rollers, one of which is shown at 7a and said belts bring the forward end of the wrapper into position to be operated on by a folding device or plate shown at 8, which operates to produce the infolded flap 4 on this end of the wrapper. This is clearly shown in Fig. 12.

The pamphlet 1 to be wrapped is placed upon a chute or incline 9, which operation may be performed either manually or by suitable feeding means not disclosed herein. It is sufficient to state that the pamphlet 1, placed on the slide 9, will descend by gravity to bring its forward edge 10 underneath the inturned flap 4. The stop member 11, forming a part of the folding means, is now swung down out of the path of the wrapper and pamphlet, to the position shown in Fig. 13. This lowering movement of stop 11 is effected by means of the pinion 12, engaging the rack 13, which is lowered at the proper time to thus cause the downward swing of the stop 11 to its lowered position seen in Fig. 13. With the stop 11 moved out of the path of the wrapper and pamphlet, the wrapper with the pamphlet resting upon it, is now carried by the belts 7 to the position shown in Fig. 13, wherein it will be noted that the wrapper 3, with the pamphlet 1 lying upon it, is located and centrally-positioned over a slot 14 provided in the top member or table portion 15 of the machine.

The proper positioning of the wrapper and pamphlet with relation to the slot 14 is attained by means of the stop or abutment 16 against which the forward end of the pamphlet and wrapper is brought. Secured to the stop 16 is a plate 17 under which the flap 4 is brought and said flap is maintained flatly by said plate against the upper surface of the pamphlet. The pamphlet is preferably centrally positioned above the slot, so that when the pamphlet is folded, the fold 2 will be approximately down the center line of the pamphlet. However, under certain specific circumstances, this fold may be off-center, or otherwise located, if desired or required.

In Fig. 13, the wrapper 3, with the pamphlet 1 lying upon it, are shown as being located above the slot 14 in readiness to be doubled upon themselves and thrust downwardly through the slot between the feed rolls and therefrom between jaws 18 and 19 of the carrier. This doubling operation, as well as the insertion of the pamphlet and wrapper between the jaws 18 and 19, is performed by means of a blade 20 carried by the end of the rocking arm 21. The blade 20 has a restricted pivotal movement in the head 22 at the end of arm 21, which movement is resiliently opposed in two directions by means of the springs shown at 23 and 24. This allows the blade to center itself during its downward movement against the magazine and wrapper.

When the blade 20 is swung downwardly by mechanism to be later described in detail, its free end 25 will contact with the upper face of the pamphlet 1 and will force the same and the wrapper 3 in company with it, down through the slot 14, and into position between the two rollers 26 and 27. This action doubles the pamphlet and wrapper upon themselves and forces them down between the jaws 18 and 19, and into contact with the adjustable stops 28 located therebetween. During the descent of the pamphlet and wrapper as above described, the infolded flap 4 of the wrapper is held in its folded position against the pamphlet by means of the pivotal guide plate 29.

As seen in Fig. 14, the doubled wrapper and pamphlet are now positioned between the jaws 18 and 19 and are held thereby, with the glue-receiving portion or flap 5 of the wrapper projecting outwardly from the pamphlet. The rotary carrier of which the jaws 18 and 19 form a part, begins to turn in the direction of the arrow shown in Fig. 14, and upon a quarter turn of the carrier, the magazine and its wrapper will be brought to the position shown in Fig. 15, wherein it will be seen that the projecting flap 5 has been brought to rest upon a ledge or support 30 constituting a gluing table, where a gluing device, including a glue-bearing brush 31, will apply a coating of glue to this flap.

The carrier then makes another quarter turn, and during this portion of travel of the carrier, the glue-bearing flap 5 is folded slightly inwardly, or at right angles to the pamphlet, by riding against the arcuate surface 32 of guide members or rails 35 which extend around the carrier for one-half of its distance of rotative travel, as is clearly seen in Fig. 5.

In Fig. 16, the pamphlet and wrapper are shown as having been brought to discharge or ejection position, which is located diametrically opposite to that of the glue-applying position of Fig. 15. At this discharge position are located pressing rolls 33 and 34, and an ejecting member movable between the jaws 18 and 19, moves the stops 28 in the direction of the short arrow shown in Fig. 16, to cause these stops to force the pamphlet and its wrapper out from between the jaws and direct them between the rolls 33 and 34 which press the glue-bearing flap 5 firmly against the outside of the wrapper 3 and cause it to adhesively adhere thereto. The rolls 33 and 34 also feed the wrapped pamphlet out of the apparatus and it descends into a suitable receptacle, or drops upon a suitable conveying means to transport it away.

The wrappers may be supplied to the conveyor belts 7 from a wrapper stack or from some other suitable source of supply by any known means, not shown, and said wrappers, when successively supplied to the belts, are carried by the belts until they halt against the stop 11 and are infolded to form the flap 4 by the inclined folder plate 8. Said folder plate 8 is supported by the springs 40 on the adjusting screws 41. As the wrappers are carried toward the right, as viewed in Fig. 9, they pass beneath the chute 9, which is pivotally and adjustably supported in brackets 42, mounted on the table portion 15 of the machine. The pamphlet, sliding down chute 9, comes to rest with its forward end located under flap 4 of the wrapper.

After the pamphlet 1 has been delivered by the chute 9, to a position on top of a wrapper, and the stop 11 is swung down out of the way, the wrapper, bearing the pamphlet, is then carried by the conveyor belts 7 beneath a plurality of rollers 43. Each of the rollers 43 is rotatively carried in a fork 47 pivoted at 48 in a bracket 49 carried by a cross-bar 50. Cross-bar 50 is resiliently carried, adjacent to its ends, by coil springs 45 surrounding the posts 46 which arise from plates 51 fixedly attached to the side frames 52 and 53 of the machine frame. The pressure of the rollers 43 can be regulated by the nuts 54 in threadable engagement with the threaded upper end portions of the posts 45. The cross bar 50 also supports a pair of fingers 55 which prevent the pamphlet and wrapper from rising as they are carried along by the belts 7.

As was previously explained, the stop 11 halts each wrapper to enable the inturned flap 4 to be produced on it, and to enable the pamphlet to find its position with its forward end extending beneath said flap. When this result has been obtained, the stop 11 is swung downwardly to the position shown in Fig. 13, by rotation of the pinion 12 caused by downward movement of the rack 13. Rack 13 is raised and lowered as required to secure the required upward and downward swing of stop 11, by means of the cam 54 secured on the rotated shaft 55, which shaft carries sprocket 56 driven by the chain 57 extending from a suitable driven shaft located adjacent to the remote end of the machine and not herein shown. The lower end of the rack 13 is provided with roller 58, riding on the cam 54, the rack being vertically guided in the fixed guideway 59, extending downwardly from the table portion 15. Spring 60 has one end attached to the rack 13 and has its other end fastened to a pin 61 extending from the rack guideway 59, and the spring acts to hold the roller 58 in contact with the periphery of the cam 54.

When the wrapper and pamphlet are brought to rest above the slot 14, as shown in Fig. 13, the stop 16 effects this halt. Said stop is adjustable to enable pamphlets of various sizes to be properly positioned for doubling and insertion down through the slot 14. The stop includes the upstanding guide pins 62 (Fig. 2) guided in slots 63 formed in the plates 17 which are secured to the table 15 of the machine. Stop 16 carries a rack 64 adapted for engagement by a spring-pressed dog 65 to hold the stop 16 in any desired position of adjustment.

The arm 21 which holds the folder and tucker blade 20, is pivoted on an oscillating shaft 66 (Fig. 1) that is rocked by means of a cam 67 in a manner to cause the blade 20 to be brought downwardly and upwardly at the required properly-timed moments. Shaft 66 carries an arm 68, provided with the cam roller 69, maintained in contact with the periphery of the cam 67 by means of the spring 70 which has one end attached to the pin 71 on the arm 68, and its other end attached to the pin 72 projecting from a horizontal bar forming a part of the side frame 52 of the machine. Extending downwardly from the shaft 66 is an arm 75 which has its lower end pivoted at 76 in clevis 77 fixed at the end of rod 78, slidably guided through guides 80 and 82. Springs 79 and 81 fitted around the rod 78 stabilize the shaft 66 and the elements mounted thereon.

The guide plate shown at 29 is mounted at the ends of the arms 83 and these arms are each pivoted in a bracket 84 secured to the table portion 15 of the machine. Each arm 83 is pivotally connected at 85 to one end of a link 86, which has its opposite end pivotally attached at 87 to arm 88 extending from shaft 66. This arrangement is such that when the shaft 66 is oscillated by the action of cam 67, the guide plate 29 will be raised and lowered as required to aid in the direction of the wrapper and pamphlet down through the slot 14 and to fold flap 4 in place. Shaft 73, carrying the cam 67 is driven by the chain 74 extending from a suitable drive shaft, not shown, but located at the remote end of the apparatus.

As the folded pamphlet and wrapper are forced down through the slot 14 by the descent of the blade 20, they extend between a pair of rotated rolls 26 and 27 and are moved downwardly thereby between the jaws of the carrier. The shafts on which the rolls 26 and 27 are respectively mounted each carries a gear 89 (Figs. 2 and 3) and these gears 89, respectively mesh with the meshed gears shown at 90 and 91, and mounted on the stud shafts 92, 93 (Fig. 9). Shaft 92 is driven by chain 94 which engages a sprocket 95 (Fig. 2) mounted on shaft 92. Shaft 92 rotates roll 26 in a clockwise direction as viewed in Figs. 9, 12, 13 and 14, while shaft 93, rotatable also in a clockwise direction, acts to rotate roll 27 in a counter-clockwise direction so that the two rolls 26 and 27 thus co-operate to move the pamphlet and wrapper downwardly into the jaws of the carrier. Chain 94 is driven from a suitable drive shaft at the remote end of the machine and not herein shown, and extends over idler 265.

The carrier, indicated generally at 100, is in the form of a pair of spiders mounted upon the intermittently-rotated shaft 97 suitably journalled in the side frames 52 of the machine. The shaft 97 is intermittently rotated by means of the Geneva movement 120 of which the pin 121 is carried by the disk 122 on short shaft 123, which carries gear 124 in mesh with gear 125 on shaft 55. The shaft 55 carries sprocket 56 engaged by chain 57 extending from a drive shaft not shown but as previously described. The carrier includes four pairs of the jaws 18 and 19 as clearly seen in Fig. 5. This arrangement is such that when one pair of jaws on the carrier is positioned directly below the rolls 26 and 27 and is receiving a pamphlet and wrapper from the rolls, a second pair of the jaws, or those located at the right in Fig. 5, are holding a pamphlet and wrapper in position to receive the glue application on flap 5 of the wrapper, as seen in Fig. 13. The third pair of jaws, or those positioned directly below the pamphlet-receiving jaws, and facing downwardly, are holding the pamphlet and wrapper idly, while the fourth pair of jaws, shown at the left of shaft 97 in Fig. 5, are having the pamphlet and wrapper ejected from between them for reception between the pressing rollers 33 and 34. Thus, the carrier 100 is rotated a quarter-turn at a time and is filled, the wrapper glued, and then ejected at the several pauses in rotation of the carrier.

Each pair of jaws 18 and 19 is mounted in fixed relation and each jaw consists of a flat plate spaced from its companion by a distance sufficient to permit of the entry of the wrapper and pamphlet between them. One of the jaws in each pair, or that shown at 18, is provided with a hinged or pivoted extremity, shown at 18a, said pivoted end part being connected by the hinges 101 (Fig. 6) to the remainder of the jaw. A clevis 102 extends from part 18a and pivoted at 103 in said clevis is one end of a rod 104. The opposite end of the rod 104 is formed with a head 105 against which one end of a coil spring 106 is urged, the opposite end of the spring resting against the end wall of a tubular housing shown at 107, said housing being attached to the larger portion of the jaw 18. This arrangement is such that the spring 106 normally urges the pivoted part 18a to the position shown in Fig. 6, or that in which the two sections of the jaw 18 are in the same plane. If and when a pamphlet and wrapper become jammed or mispositioned between the jaws of any pair, this hinged arrangement enables the part 18a to be manually drawn down so that access to the jammed pamphlet and wrapper can easily be had and the same is manually removed from between the jaws.

Located between the jaws in each pair are adjustable stop members 28, shown in detail in Fig. 7. Said stop members each consist of a square pin positioned for sliding movement in registering slots 108 formed in the two jaws 18 and 19, and movable in said slots to position against collar 110 to thereby determine the distance to which the wrapper and pamphlet will be inserted in each pair of jaws. Each of the stop pins 28 is slidable along the length of a notched rod 109 supported on the jaw 19. The collar 110 includes a spring-pressed ball 110a (Fig. 7), adapted for engagement with any of the selected notches 111 to thereby position the collar at the required location for pamphlets of various sizes and locate the stops at the proper inner position to contact the pamphlet when it is inserted between the jaws.

Each pair of the jaws 18 and 19 is provided with a gravity-controlled gripping device. This consists of a sliding weighted finger 112, which is slidable to a limited extent through an aperture in the wall of the jaw 18. The gravity-finger 112 is slidable within an inclined housing 113 attached to the outer face of the jaw 18. A pin 114 is movable within a slot 115 (Fig. 3) in the housing and limits the sliding movement of the gripper 112. The operation of this gravity-gripper 112 is such that when a pamphlet and wrapper are being inserted between the two jaws 18 and 19 that are then positioned directly under the rolls 26 and 27, gravity will cause the gripper to be positioned in its retracted position as seen in Fig. 5 with respect to the uppermost jaws in that figure. The gripper thus does not, at this time, have its free end projecting between the jaws and so will not interfere with the insertion of the pamphlet and wrapper between these two jaws. The gripper becomes advanced to gripping position while the pamphlet-carrying jaws are moved to gluing position (see left pair of jaws in Fig. 5) and remains so while the jaws hold the pamphlet at the gluing station. The gripper 112 remains operative as the jaws move downwardly to the central, lower position, wherein the gripper in its advanced or gripping position is shown at 112a in Fig. 5. The downwardly-directed jaws would normally tend to allow the pamphlet and wrapper to fall out, but this is prevented by engagement of the gripper against the pamphlet and wrapper, even though a relatively thin and flat pamphlet and wrapper are located between the downwardly-directed jaws. As the jaws are swung upward to reach ejection position at the right in Fig. 5, the gripper will be retracted by gravity so as not to interfere with the ejection of the pamphlet and its applied wrapper at the ejection station.

When each pamphlet and its wrapper are brought to the gluing station at the left in Fig. 5 and the wrapper is positioned as shown in Fig. 15, where the flap portion 5 of the wrapper is rested upon the ledge 30, the gluing apparatus is brought into action to apply a strip or band of glue to the then upper surface of the flap 5. The gluing mechanism which performs this function is best disclosed in Figs. 10 and 11.

Mounted upon a cross brace 129 at the lower portion of the frame of the machine, is a support 130 upon which the glue fountain 131 is fixedly supported. A glue-distributing roller 132 is rotatively mounted in the fountain, and a doctor blade 133 (Fig. 5) is operative against the roller. Roller 132 is continuously rotated by means of a sprocket 134 mounted on the shaft of the roller, said sprocket being engaged by the chain 57. The brush 31, which receives its charge of glue from the roller 132, is shown in its retracted position, in Figs. 5 and 8, and is there in contact with the surface of roller 132. Said brush may be a lengthy-continuous one, or it may be made up sectionally so that sections may be added or removed to enable the brush to be made of the length required for wrappers of different lengths. The head of the brush, indicated at 135, has projecting pins 136 at its opposite ends, said pins each riding in a cam slot 136a formed in a bracket 137 having a downwardly-extending arm 138, by which it is attached by the screws 139 to a part of the glue fountain. Stop 266 acts to direct the brush head in position to hold the bristles 31 against roller 132 while the brush is retracted. Mounted on the top of the bracket 137 and adjacent to the forward end of the same, is a bracket member 140 in which a finger 142 is pivoted as indicated at 141. Said finger 142 is normally retracted to the position shown in Fig. 10 by means of the spring 143. A link 144 is pivotally connected at one end to the pin 136, and its opposite end is pivoted at 145 to the upper end of an oscillating arm 146. At its opposite end, the arm 146 is secured on the rocking shaft 147 mounted for oscillating movement in bearings 148. One end of the shaft 147 is rotatively mounted in the bearing plate 149 (see Fig. 9) and said end of the shaft carries a lever 150, similar to arm 146, except that it carries a cam surface 151 engaged by a cam roller 152, carried by a crank 153 secured on the shaft 154. Cam surface 151 is held against roller 152 by spring 175. Shaft 154 carries gear 155 in mesh with the gear 156 carried on the shaft 157 of the glue roller 132. At its upper end, the cam lever 150 is pivotally connected at 159 to link 158 which is similar to the link 144, and has its opposite end connected to one end of the brush head 135.

Pivoted at 160 in bracket 161 projecting downwardly from the under side of the ledge 30, is a feeler 162 of bell-crank form. Said feeler 162 has an arm 163 normally directed toward the glue fountain as in Fig. 10, and has its other arm, indicated at 164, formed with an extremity or nose 165 adapted to enter upwardly through a slot 166 in each of the jaws 19 when said jaw is located at the gluing station, and contact with the wrapper and pamphlet then located between the jaws at that station, provided a wrapper and pamphlet are then carried by the jaws then so located. Thus, the feeler constitutes an element by means of which the lowering of the glue-bearing brush to position of actual glue application is controlled. When a wrapper and pamphlet are not carried by jaws located at the gluing station, the brush 31 will be held in an elevated position and away from the ledge 30 so that said ledge will not become soiled by the glue.

As will be seen in Figs. 10 and 11, arm 146 carries a finger 167, pivoted to the arm 146 at 168, and having a nose portion 169 (Fig. 10) adapted to take under a roller 170 on the brush head 135 and hold the brush elevated when a wrapper and pamphlet are not between the jaws located at the gluing station. The finger 167 is spring-biased as shown at 171 to normally hold it into contact with a spring-pressed roller 172 carried by the arm 146 in position to be contacted by the arm 163 of the feeler 162 when the nose portion 165 of said feeler is contacting a pamphlet and wrapper then in glue-receiving position as shown in Fig. 11.

In Fig. 10, the glue-applying brush is shown in its retracted position, or in contact with glue roller 132. As brush head 135 is swung toward the ledge 30 upon which the flap 5 of a wrapper is resting, roller 172 will come into contact with the arm 163 of the feeler 162 and will swing the feeler on its pivot 160 to bring the arm 164 of the feeler upwardly in opposition to the pull of spring 173, to thereby cause the nose 165 to enter through slot 166 as shown in Fig. 11. If a pamphlet and wrapper are properly located in position between the jaws of the carrier, as also shown in Fig. 11, the further upward swing of arm 164 will then be opposed by the pamphlet and arm 163 will exert pressure on the roller 172, forcing said roller against the finger 167, thereby swinging finger 167 toward the right as in Fig. 11, so that the brush can now come down into contact with the flap 5 of the wrapper then resting on ledge 30, and apply glue thereto. The brush is firmly pressed against the flap 5 by pressure of the spring-pressed finger 142 against roller 170.

When a wrapper and pamphlet are not in position between the jaws located at the glue-receiving station, and the brush is moved toward the ledge 30, the nose 165, entering upwardly through the slot 166, will meet no resistance and hence will not exert sufficient pressure on the roller 172 to cause the roller to move finger 167. In such case, the finger 167 will have its nose 169 so positioned that it will engage under roller 170 and thus hold the brush 31 elevated, and away from the top of the ledge 30 and free from contact therewith. This arrangement is such that the brush will only be depressed to contact the ledge 30 when a flap 5 of a wrapper is positioned thereon. As the brush is retracted or is moved away from the ledge 30, it will do so with a wiping action across the surface of the flap 5, thus applying an even layer of glue to the same.

After the flap 5 has received its coating of glue, as above described, the carrier will rotate for a quarter turn to carry the pamphlet and wrapper one step toward ejection position. When the jaws holding the pamphlet and wrapper are directed downwardly, as shown at the lower portion of Fig. 5, the gripper 112 will be gravity-directed to its projecting position as shown at 112a, and will hold the pamphlet and wrapper from falling out from between the jaws. During travel of the pamphlet-holding jaws from gluing position to the downwardly-directed position, the glue-bearing flap 5 will be directed to a position where it is disposed at approximately right angles to the plane of the folded pamphlet.

On the next quarter turn of the carrier, the pamphlet and wrapper will be brought to ejection position, or that shown at the right in Fig. 5. Located between the jaws 18 and 19 in each of the four pairs, is an ejection bar 180 which is square in cross-sectional shape for the greater portion of its length, and is provided at its opposite ends with cylindrical portions 181, which extend beyond the side ends of the jaws 18 and 19. Secured to the inner side of one of the frame members 52 is a hub or block 182 (Figs. 3 and 4) provided in its face with an annular groove or track indicated at 183. At the opposite side of the machine is a similar block 184, also provided with the annular groove 183. The cylindrical extremities 181 of the ejection bars of the four pairs of jaws are arranged in these grooves 183 and are moved in the circular path defined by the grooves as the carrier 100 is intermittently rotated. As will be seen in Fig. 4, the block 182 is notched as indicated at 185, and a pivoted lever 186 is provided with a head portion 187 constituting a segment of the block 182. When said lever 186 is in the position shown in Fig. 4, the segment 187 fits in notch 185, and the portion of the groove 183 that is provided in the head 187 will register with the remainder of the groove formed in the block 182. The result is that while the lever 186 is in the position shown in Fig. 4, the groove 183 will be continuous and the four ejection bars may move through it.

At its lower end, lever 186 is free on a rocking shaft 188, extending across the machine and journalled at its opposite ends in the side frames 52 of the machine. Secured on the shaft 188 is a lever 189, provided at its upper end with a grooved head or segment 187a similar to that shown at 187, and the segment 187a operates with respect to block 182. Also secured on the shaft 188 is a cam lever 190 carrying roller 191 at its upper end, said roller being operative against the edge of the cam 192, said cam being secured upon the shaft 123. Lever 186 and the cam lever 190 are connected by the spring 193. Spring 194 has one end attached to the cam lever 190 and has its other end attached to the machine frame as indicated at 195. Lever 186 is provided with a projecting pin 196 which is held against an edge portion of the cam lever 190, as shown in Figs. 3 and 4.

When a pair of the jaws 18 and 19 reaches the position of ejection, the four ejection rods 181 are in the positions shown in Figs. 4 and 5, and it will be therein noted that the segment 187 is in position in the block 182. At this time also, segment 187a is in a similar position in block 184. Cam roller 191, reaching the flat portion 197 of the cam 192 results in cam lever 190 under the impulse of spring 194, swinging quickly to the left, as viewed in Fig. 4. The ejection rod 181 that is at that time positioned in the section of groove 183 that is formed in segment 187 will be moved with lever 186 to the left, since lever 186 will be caused to be swung in that direction due to the cam lever 190 engaging against pin 196. It will, of course, be understood that since shaft 188 will be rotatively moved when cam lever 190 is swung, the lever 189 will also be similarly swung so that both ends 181 of the ejection bar that are disposed in the segment grooves will be moved, and thus the bar shown at 181a in Fig. 9 will be moved, toward the outer or free ends of the jaws 18 and 19 between which it is located.

As will be seen in Fig. 5, each of the bars 180 is located between the jaws in each pair behind the stops 28, and as the ejection bar is moved to the ejection position 181a, it will cause the stops 28 in advance of it, to move the pamphlet and wrapper then between the jaws, forwardly and partly out of the jaws to be engaged between the pressing and delivery rollers 33 and 34. These rollers press down the glue-bearing flap 5 against the face of the wrapper, as shown in Fig. 16 and eject the wrapped pamphlet from between them. The rollers 33 and 34 are driven by the chain 94 which extends around a sprocket 200 (Fig. 8) on a short shaft 201, rotative in one of the frame members and in the bracket 202. The shaft 201 carries a gear 203 meshing with a gear 204 mounted on the shaft of roller 33. Gear 203 also meshes with a gear 205 on short shaft 206, and gear 205 meshes with a gear 207 secured on the shaft of roller 34. The pressure between the rollers 33 and 34 is regulated by the springs 208 and handwheel 209.

From the foregoing, the operation of the described apparatus will be apparent. As each wrapper is carried by the belts 7 it will be brought to rest against stop 11 and infolded under the folding plate 8 to produce flap 4. A pamphlet placed on chute 9, manually or by automatic means, will descend in the chute and its forward edge will enter under the infolded flap 4. Stop 11 is then swung downwardly and out of the way, and wrapper and pamphlet are carried by the belts 7 under the pressure rollers 43 and come to a halt against stop 16. Blade 25 is now brought down and the same doubles the pamphlet and wrapper upon themselves and thrusts the same down through the slot 14 and between the rolls 26 and 27 which grip them and feed them down between the jaws 18 and 19. Carrier 100 now rotates for a quarter turn to bring the pamphlet and wrapper to gluing position and when this position is reached, the flap 5 is located upon ledge 30. Brush 31 is now swung over the flap 5 and brought down into contact with the same and then retracted, leaving a layer of glue on said flap.

The carrier 100 now moves through another quarter turn and gripper 112 becomes effective, as seen at 112a, to hold the pamphlet and wrapper from falling out from between the jaws. On the next quarter turn of the carrier, the wrapper and pamphlet are presented for ejection, and at the proper time, roller 191 reaches the flat portion 197 of the cam 192 and cam lever 190 swings in a manner to move levers 186 and 189 and cause them to move the ejection bar 181, then engaged by them, toward the outlet end of the jaws, forcing the stops 28, disposed between said jaws, to move the magazine partly out from between the jaws and into position between the pressing rollers 33 and 34 which complete the sealing of the wrapper and feed the wrapped pamphlet out of the machine. The shoulder 220 on the cam 192 retracts cam lever 190 and it draws back levers 186 and 189 to the position shown in Fig. 4. The cycle just described is repeated and the wrapped pamphlets pass rapidly out of the machine, each wrapper being snugly and securely fitted around the pamphlet.

Having described a single embodiment of the invention, it is obvious that the same is not to be restricted thereto, but is broad enough to cover all structures coming within the scope of the annexed claims.

What I claim is:

1. In a wrapper-applying machine, a movable carrier for a pamphlet and a partially-applied wrapper from which a flap projects, a surface on which the flap is brought to rest by movement of the carrier, glue-applying means located adjacent to said surface, said glue-applying means including a movable applicator movable from glue-receiving position to a position of glue-application above the flap rested on said surface, means for raising and lowering the glue-applicator relatively to said surface, and means for preventing lowering movement of the applicator toward the surface when said applicator is positioned above the surface and the flap of a wrapper is not rested thereon.

2. In a wrapper-applying apparatus, a rotary carrier having a pair of spaced, fixed plates constituting jaws between which a pamphlet and a wrapper therefor are held, one of the plates being apertured, an angular guide extending from the plate and a freely-slidable weight movable by gravity in said guide and through the aperture in the plate to engage against the pamphlet and wrapper while the same are borne by the carrier to thereby hold the pamphlet and wrapper from displacement from between the plates during rotation of the carrier.

3. In a wrapper-applying apparatus, a support over which a wrapper is transported, means for infolding an edge of the wrapper, stop means at which the wrapper with said infolded edge is halted, means for guiding a pamphlet to a position of rest on top of the wrapper and with an edge of the pamphlet against the infolded part of the wrapper, the support having an elongated slot over which the wrapper and pamphlet are brought to a halt, a blade movable down through the slot and operative against the pamphlet and wrapper to double them upon themselves and force said doubled pamphlet and wrapper down through the slot, a rotary carrier operative below the slot and having radial pairs of jaws which receive the pamphlet and wrapper as they are forced down through the slot, a glue-applying device to which the pamphlet and wrapper are conveyed by movement of the carrier and which applies glue to a projecting flap-portion of the wrapper, ejecting means for moving the pamphlet and wrapper out of the jaws of the carrier, and pressure means for pressing the glue-bearing projecting flap-portion of the wrapper against the outside of the wrapper.

4. In a wrapper-applying apparatus, a rotary carrier and means for intermittently rotating the same, pamphlet-gripping means arranged radially on the carrier, gluing means located adjacent to the carrier and at which the carrier is halted in its rotative movement, said gluing means including a ledge on which a flap portion of a wrapper carried by the carrier is brought to rest, a glue fountain, a roller operative therein, a brush carrier having a brush held against the roller in one position of the brush carrier, means for moving the brush carrier in a direction to bring it away from the roller to a position above the ledge and to bring the brush down into contact with the flap portion then disposed on said ledge, and for retracting the brush toward the roller simultaneously with the removal of the flap portion of the wrapper from the ledge by movement of the carrier.

5. In a wrapper-applying apparatus, means for infolding one edge of a wrapper, means for guiding a pamphlet into position on top of the wrapper with one edge of the pamphlet located under the infolded portion of the wrapper, a rotary carrier, means for delivering a folded pamphlet and its wrapper to the carrier in a manner to provide for a projecting flap portion on the wrapper, gluing means to which the pamphlet and wrapper are carried and at which the projecting flap portion receives an application of glue, guide means arranged around the carrier to direct the glue-bearing flap portion in a direction toward the body of the wrapper, an ejection station at which the partly-wrapped pamphlet is removed from the carrier, and means for thereafter pressing the glue-bearing flap against the outside of the wrapper.

6. In a wrapper-applying apparatus, means for folding an edge portion of a wrapper, means for delivering a pamphlet to a position of rest on top of the folded wrapper with an edge of the pamphlet inserted in the fold in the wrapper, a rotating carrier having a plurality of pairs of jaws, a surface over which the pamphlet and wrapper are moved together, an aperture in said surface and below which each pair of jaws is successively positioned, means operative above the pamphlet wrapper for forcing the same down through the aperture and between the pair of jaws then positioned below the aperture, a glue-applying device to which the pamphlet and wrapper are carried by the jaws on movement of the carrier, said glue-applying device being operative to apply glue to a part of the wrapper then projecting beyond the pamphlet, means for ejecting the wrapper pamphlet from between the jaws and means for pressing the glue-bearing part of the wrapper against the body of the wrapper as the wrapped pamphlet is ejected.

7. In a wrapper-applying apparatus, means for folding an edge portion of a wrapper, means for delivering a pamphlet to a position of rest on top of the folded wrapper and with an edge of the pamphlet inserted in the fold in the wrapper, a rotating carrier having at least one pair of jaws which are moved by said carrier to a filling station, to a gluing station and to an ejection station, the filling station including a support for the pamphlet and its wrapper, said station having a slot, a movable blade operative to double the magazine and wrapper upon themselves and force the same through the slot and between the jaws, the gluing station having a ledge upon which a projecting flap portion of the wrapper is brought to rest when the jaws are halted at said gluing station, glue-applying means operative against said flap portion to apply glue thereto, means operative at the ejecting station to force the wrapped pamphlet out from between the jaws, and pressure means operative to press the glue-bearing flap portion against the body of the wrapper as the wrapped pamphlet is ejected from between the jaws.

8. In a wrapper-applying apparatus, means for folding an edge portion of a wrapper, means for delivering a pamphlet to a position of rest on top of the folded wrapper and with an edge portion of the pamphlet inserted in the fold in the wrapper, a rotating carrier having at least one pair of jaws which are moved by said carrier to a filling station, to a gluing station and to an ejection station, the filling station including a support for the pamphlet and its wrapper, said station having an elongated slot, a swinging blade operative to double the magazine and wrapper upon themselves and force the same through the slot and between the jaws; the gluing station having a ledge upon which a projecting flap portion of the wrapper is brought to rest when the jaws are halted at said gluing station, glue-applying means operative against said flap portion to apply glue thereto, means for preventing glue-application when the flap of the wrapper is not properly positioned at the gluing station, means operative at the ejecting station to force the wrapped pamphlet out from between the jaws, and pressure means operative to press the glue-bearing flap portion against the body of the wrapper as the wrapped pamphlet is ejected from between the jaws.

9. In a wrapper-applying mechanism, a rotating carrier, means for moving the same from a filling station to a glue-applying station and then to an ejection station, means at the filling station for doubling a pamphlet and wrapper and depositing the same on the carrier, means at the gluing station for applying a glue coating to a projecting flap of the wrapper while the wrapper and its pamphlet are held on the carrier, means at the ejection station consisting of a slidable element carried with the carrier and co-operating with a pivotal element only when the carrier is halted at the ejection station for forcing the pamphlet and its wrapper out of the grip of the carrier, and pressure means for forcing the projecting glue-bearing flap against the body of the wrapper.

10. In a wrapper-applying mechanism, a rotating carrier, means for moving the same from a filling station to a glue-applying station and then to an ejection station, means at the filling station for depositing a pamphlet and a contiguously-arranged wrapper on the carrier, means at the gluing station for applying a glue coating to a projecting part of the wrapper while the wrapper and its pamphlet are held on the carrier, means at the ejection station including a bar located between and carried with the carrier and moved by oscillating means independent of the carrier and engaging said bar only at a half of the carrier for forcing the magazine and wrapper out of the grip of the carrier, and rollers for pressing the glue-bearing flap of the wrapper against the body of the wrapper.

11. In a wrapper-applying apparatus, means for carrying a wrapper with a pamphlet flatly disposed on top of it and with one edge of the pamphlet extended under an infolded part of the wrapper, a support over which the wrapper and pamphlet are moved, a slot in the support, a swinging blade located above the pamphlet and wrapper and operative to strike the pamphlet and wrapper and fold the same and force them down through the slot, a carrier rotative below the slot and intermittently operated in a manner to locate a pair of jaws on said carrier below the slot in each pause in the rotative movement of the carrier, the magazine and wrapper being deposited in the jaws upon the downstroke of the blade, a ledge at which the jaws are halted on each pause in the rotative movement of the carrier to thereby bring a flap portion of the wrapper to rest upon said ledge, a gluing device having an applicator movable to a position above the ledge and movable downwardly to apply glue on the flap portion while said flap portion rests on the ledge, an ejection station to which the pamphlet and wrapper are then conveyed by the carrier, means operative to prefold the glue-bearing flap as it is borne by the carrier from the gluing device toward the ejection station, means at the ejection station for forcing the pamphlet and its wrapper out of the jaws of the carrier, and pressure means operative to force the glue-bearing flap against the outer face of the wrapper and cause the flap to adhere thereto.

12. In a wrapper-applying mechanism, a rotary carrier having a pair of spaced plate-like jaws between which a pamphlet and its wrapper are carried, ejection means for moving the pamphlet and wrapper from between said jaws comprising a bar located between and carried with the jaws and movable to or from the free ends of the jaws, an oscillating lever engaging the ends of the bar only when the carrier is halted at an ejection position and movable when engaged with the bar to cause the bar to push the wrapper and pamphlet out from between the jaws, and pressure means between which the pamphlet and wrapper are moved when the same are ejected from between the jaws.

13. In a wrapper-applying apparatus, an intermittently-rotated carrier including a pair of jaws between which a pamphlet and a partly-applied wrapper are held, an ejecting element located between the jaws and movable with the conveyor and disposed behind the pamphlet and wrapper for ejecting the pamphlet and wrapper at a halt in the movement of the carrier, said ejecting element having extended end portions movable in a circular path when the carrier is rotated, and means for engaging said projecting end portions at a halt in the movement of the conveyor and moving the ejecting element toward an outlet end of the jaws to thereby eject the pamphlet and wrapper therefrom, said means becoming separable from the ejecting element upon a subsequent rotative movement of the carrier after the ejection.

14. The method of wrapping a pamphlet, magazine or similar article consisting in folding one edge of a wrapper to form a narrow, inturned, raised strip portion on the wrapper, supporting said folded wrapper with its fold disposed against stop means and with said strip portion in raised position, moving the pamphlet relative to the wrapper to bring one edge of the pamphlet against the fold in the wrapper and under the strip portion and between said strip portion and body of the wrapper to insure definite positioning of the pamphlet in respect to the wrapper, doubling the pamphlet and wrapper upon themselves and permitting an edge portion of the wrapper to extend beyond the pamphlet to form a gluing flap, holding the pamphlet and wrapper in their doubled form, applying glue to the flap portion of the wrapper, folding the glue-bearing flap toward the wrapper, releasing the pamphlet and wrapper from the holding means and applying pressure to the doubled pamphlet and wrappeer in a manner to cause the flap portion to be adhesively attached to the outer face of the wrapper and form the wrapper into a sleeve enclosing the pamphlet.

References Cited in the file of this patent

UNITED STATES PATENTS

| | | |
|---|---|---|
| 264,380 | Waters | Sept. 12, 1882 |
| 772,202 | Aspinwall | Oct. 11, 1904 |
| 1,161,785 | Moore | Nov. 23, 1915 |
| 1,202,955 | Anderson | Oct. 31, 1916 |
| 2,019,212 | Clare | Oct. 29, 1935 |
| 2,370,072 | Ranney | Feb. 20, 1945 |